Patented May 22, 1951

2,554,152

UNITED STATES PATENT OFFICE 2,554,152

GLUCOSE DERIVATIVE COMPOSITIONS

Bruce Osborne, New York, and Harry E. Henneman, Pelham, N. Y., assignors to American Home Products Corporation, New York, N. Y., a corporation of Delaware No Drawing. Application January 24, 1950, Serial No. 140,346

13 Claims. (Cl. 99—141)

This invention relates to an improved sweetening material normally to be employed as a sugar substitute by diabetics or others who wish to avoid the use of ordinary sugars because they may be harmful or undesirable, or because the user desires to regulate his weight. The invention further relates to a new and additional use of this improved product for other purposes, such as a diuretic. This material may be substituted for sucrose, glucose or other sweetening agents now in general use and the substituted material will produce a new product which will satisfy the appetite for sweetness but will not have the metabolizing effect or the caloric value of the conventionally used sweetening materials.

The invention further relates to the use of such a material, either substantially alone or incorporated as a sweetening agent, in a food, or in a beverage, or in any carrier which coacts with the sweetening agent to enhance its effectiveness but which may, if desired, be an inert carrier. The term "carrier" is to be understood as including foods and beverages, and the like. This improved product is taken orally, whether alone or as incorporated in a carrier. By the use of this sugar substitute material or product, a diabetic may satisfy his craving for sugar without the undesirable after effects of sugar.

It is an object of this invention to provide a palatable food or beverage or other edible composition having therein a sweetening agent which when ingested will satisfy the human craving for sugar, but which will be eliminated from the body in substantially the same form and substantially the same quantity as when it was taken in. Stated in medical or physiological terms, the improved material or product passes through the body substantially unmetabolized.

It is a further object to use the compound in pharmaceutical preparations as a substitute or replacement for glucose, dextrose, sucrose or other sweetening agent.

It is a still further object to use the compound in pharmaceutical preparations as a diuretic and for its diuretic action.

It will be noted particularly that this improved product has an excellent value for the reason that it contains none of the materials known to be harmful to the body, which is not the case with diuretics now in general use.

Other advantages and values and effectiveness of this improved product will become more apparent as the detailed descriptions below are presented.

The compound is made by chemically treating a glucose so that the resulting compound is a modified or substituted glucose which has little or no metabolizing action in the body.

More specifically, D-glucose having the formula $C_6H_{12}O_6$ is treated in a sequence of steps to form D-3-methyl glucose which may also be identified as alpha-D-3-methyl glucose,

Structurally the formula may be represented as follows:

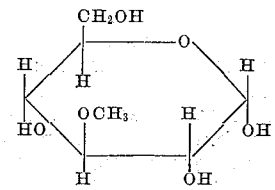

Hereinafter, reference to the above compound will be by the simplified expression, 3-methyl glucose.

An illustrative process for obtaining 3-methyl glucose follows. It should be understood that the process as given is merely illustrative and not to be considered limitative since many variations are possible without departing from the spirit of the invention.

PREPARATION OF DIACETONE GLUCOSE

Acetone (80 litres) is placed in an open, glass-lined jacketed pan (Pfaudler; 30 gallons capacity) and agitated efficiently ("Lightening" stirrer). Water is passed through the cooling jacket and the temperature of the acetone brought to 18° C. Concentrated sulphuric acid (3500 c. c., $d=1.84$) is now added gradually so that the temperature of the solution remains below 25° C. When the addition is complete, dextrose (4 kg.) is added in one lot and the mixture stirred for 15 hours at 15°. It is important that the temperature should remain low. Solution is slow but is ultimately complete.

The reaction mixture is now neutralized with an aqueous solution of sodium hydroxide (5300 g. of NaOH in the minimum quantity of water)—addition is gradual and the temperature is carefully controlled so that it does not rise above 20–25°. Addition of sodium hydroxide is stopped when a pH of 8.5 to 9 is attained.

Sodium sulphate precipitates and is allowed to settle, the supernatant acetone is decanted or syphoned off and the sodium sulphate washed with acetone (12 litres) and the washings combined with the main bulk of acetone. The residual sodium sulphate is dissolved in water (20 gallons) and the solution stirred with chloroform (6 to 12 litres)—the aqueous layer is allowed to separate and is removed and discarded.

The combined acetone solutions are concentrated in a vacuum still (10 gallon, Pfaudler, temperature of kettle ca. 50° C.). The concentrate is diluted with water (15 litres) and is then stirred with the chloroform which has been previously used to extract the sodium sulphate solution and the chloroform layer collected. The extraction of the aqueous phase is repeated thrice ($3 \times 6000$ c. c. $CHCl_3$) and the combined chloroform extracts dried ($Na_2SO_4$). The aqueous phase is discarded.

The chloroform extracts are filtered, concentrated under reduced pressure to a volume of ca. 6 litres and poured while hot into stirred hexane (10 litres) previously cooled to $-5°$. The mixture sets to a crystalline semi-solid mass. The product is collected, drained and washed with hexane (1½ litres). The product is a white crystalline powder. M. Pt. 105–107° C.

PREPARATION OF 3-METHYL DIACETONE GLUCOSE 300 gms. of diacetone glucose are made into a paste with 150 c. c. of water and the reaction mixture heated and stirred at 70° C. During a period of 1 hour, 315 c. c. of 50% aqueous potassium hydroxide and 325 c. c. of dimethyl sulphate are added simultaneously through dripping funnels—this addition is gradual and is regulated so that the reaction mixture is maintained in an alkaline state. After the addition is complete, the reaction mixture is stirred for 1 hour at 70–75° then cooled and extracted with ether ($4 \times 300$ c. c.). The combined ether extracts are dried over potassium carbonate, filtered and the solvent removed. The residue is distilled under reduced pressure. Approximately 200 gms. of colorless liquid, boiling at 113–117°/ mm., are collected.

PREPARATION OF 3-METHYL GLUCOSE

Water (10 litres) and concentrated sulphuric acid (200 c. c.) are placed in a round-bottomed 12 litres flask and agitated on a waterbath at 100° C. 3-methyl diacetone glucose (600 gms.) is now added and the mixture heated and stirred for 3 hours—complete solution is gradually attained.

Basic lead acetate (1220 gms., 10% excess) is now added to the reaction mixture which is then stirred for a few minutes and filtered while hot. The filtrate is cooled and hydrogen sulphide is passed through it until precipitation of lead sulphide is complete. The lead sulphide is removed by filtration, washed with water and the combined filtrate and washings concentrated under vacuum to a volume of ca. 2 litres. The hot solution is now stirred with charcoal for 20 minutes and is then filtered and concentrated further under pressure. Finally successive small quantities of absolute ethanol are added and evaporated off under reduced pressure, in order to remove moistures. If pure, the product finally solidifies at this stage, but a thick syrup may be obtained.

The material is extracted by rubbing with absolute acetone and the acetone is decanted—after three such treatments the product is washed with a little cold absolute methanol and is finally rubbed with hot absolute methanol. A white crystalline solvent is finally obtained. The material is collected and washed with a little absolute methanol followed by dry ether. M. Pt. 163–167°.

The product thus obtained is pure enough for all practical purposes but may smell of acetic acid. It can be further purified by "boiling out" with absolute methanol, filtering hot and re-working the filtrate.

It is to be particularly pointed out, in regard to the above structural chemical formula, that this improved and modified 3-methyl glucose may be taken alone or combined with other active ingredients and/or with a carrier so as to make the improved product more effective or especially attractive and desired by the diabetic, obese, edematous or other person.

When this modified glucose product is ingested, whether incorporated with other materials or not, there will be substantially no reactions of this substance within the body, and thus it will be easily carried through and out of the body or system, substantially unmetabolized.

With regard to specific types of carriers useful with this compound, one of the carrier materials, as an example, may be cellulose flour which acts to give bulk and which satisfies hunger without giving nourishment to the human system.

Another carrier may be merely water, the 3-methyl glucose being dissolved therein to form the equivalent of a simple syrup. A syrup of this type would contain, after a reasonable period of time, not only alpha-, but also beta-3-methyl glucose, there eventually being an equilibrium mixture of both alpha and beta forms.

Another type of carrier may be one of several foods, such as bread, doughnuts, buns, cakes, pies, syrups, puddings, confections such as candies, chewing gum, and the like, in which the improved product of the modified 3-methyl glucose is substituted for, or replaces in substantial amounts, the ordinary sweetening agent. Also, one may combine wheat or gluten flour with 3-methyl glucose or combine the latter in a dry premix package with other ingredients to make bread, cake, dessert, etc. When such a combination of the improved product and any one of the food carriers just mentioned is taken orally, the food carrier will metabolize in its normal manner and the improved product will hardly metabolize to any extent.

Furthermore, the combination of the improved modified 3-methyl glucose product with flavored water has been found to produce a new product such as a new soft drink which may have the sweetness desired by the consumer, but this soft drink will be lacking the carbohydrate metabolism in the body which normally follows the consumption of soft drinks sweetened with the ordinary and commonly used sweetening agents.

The 3-methyl glucose may also be packaged for use either in loaf or in convenient lump form utilizing a small amount, namely about 5% or somewhat less, of a starch to permit easy disintegration. As a sweetening agent, the product may also be packaged in loose crystalline form for bulk sales.

The following specific composition examples are further illustrative of the invention. These examples are not to be considered limitative since variations and modifications, as will be obvious to those skilled in the art, may be made without departing from the spirit of the invention.

Example 1

A gluten bread for diabetics may be made in known manner from the following ingredients:

| | |
|---|---|
| Gluten flour | lbs__ 6 |
| Yeast | oz__ 1.7 |

| | | |
|---|---|---|
| Alpha-D-3-methyl glucose | do | 1.4 |
| Salt | do | 0.7 |
| Water (boiling) | pints | 2 |

As variations, one may use some wheat flour for an equal amount of gluten flour; and milk may be substituted for the water. In addition, a shortening such as butter, lard or hydrogenated vegetable fat may be used to the extent of about 1 to 2 tablespoons.

Example 2

A lemon chiffon pie of normal sweetness may be made free of sugar by first preparing in the usual way an undercrust of the following ingredients:

| | | |
|---|---|---|
| Flour | lbs | 1.5 |
| Shortening | do | 0.5 |
| Water (cold) | oz | 3.5 |
| Salt | do | 0.25 |

This is baked at 500° F. until done.

The pie filling is prepared by mixing 23.5 oz. of alpha-D-3-methyl glucose with 0.15 oz. salt and 1 oz. of lemon rind and 4 oz. of lemon juice. To this mixture is added 8 oz. of water and 7 oz. of vegetable shortening and the mixture is heated to boiling. When the boiling point is reached, 12 oz. of egg yolks are added and heating is continued long enough to thicken the mixture, heating being thereafter terminated. To the mixture is now added 1 oz. of gelatin previously soaked until soft in 5 oz. of cold water. A meringue made with 10 oz. of egg white and 10 oz. of 3-methyl glucose is whipped into the mixture as prepared above, and after filling the baked pastry undercrust, more meringue may be added on top.

Example 3

To make a dehydrated gingerbread mix, 10 lbs. of molasses and 1.1 lbs. of shortening are mixed to obtain homogeneous dispersion. To the mixture, 10 lbs. of wheat flour or a mixture of 5 lbs. of wheat flour and 5 lbs. of gluten flour are gradually added. The dough is heat dried at about 160–170° F. under reduced pressure and then ground and pulverized. To the pulverized mixture, one now adds 1.5 lbs. of alpha-D-3-methyl glucose, 1 oz. salt, 5 oz. baking soda, 10 oz. powdered whole egg, 1 oz. powdered ginger and 0.5 oz. of powdered cinnamon and thoroughly mixes all the ingredients to obtain a homogeneous dispersion.

Example 4

A gelatin dessert may be made by mixing 11 lbs. of alpha-D-3-methyl glucose, 1.5 lbs. of gelatin powder, 3.5 oz. of citric acid powder, 0.6 oz. of true pineapple flavor, 50 minims of butyl acetate, and 0.5 oz. of certified food color such as Tartrazine color powder. Approximately 3 oz. of this powder added to 1 pint of boiling water will make a pineapple flavored gelatin dessert.

Example 5

An artificial maple syrup may be prepared by mixing 3 lbs. of alpha-D-3-methyl glucose, 1 gallon of water, 0.2 fluid oz. of mapleine and sufficient caramel color to give the desired color to the product.

Example 6

A fondant cream useful as a center for candies may be made by heating 1 gallon of water to which has been added 6 lbs. of alpha-D-3-methyl glucose, 12 lbs. of cane sugar, and 2 lbs. of Nulomoline syrup. The mixture is boiled rapidly to about 240–250° F. and is thereafter cooled to 110°–125° F. and agitated to the desired consistency. Any flavoring agent may be added, if desired.

Example 7

A soft drink syrup may be prepared by combining 6.5 lbs. of alpha-D-3-methyl glucose, 10 fluid oz. of distilled lime oil emulsion, 40 fluid oz. of fresh lime juice, and 0.5 oz. of sodium benzoate. One gallon of water is now added and to each fluid ounce of the syrup one adds 4 to 5 fluid ounces of carbonated water.

Example 8

A substantially non-metabolic confectioner's sugar is prepared by combining 8 lbs. of alpha-D-3-methyl glucose with ¼ lb. of cornstarch.

Example 9

A medicinal tablet effective for diuretic action is prepared by intimately mixing 50 milligrams of alpha-D-3-methyl glucose with 2.5 milligrams of cornstarch. The tablet may be either plain or enteric coated, with the former preferred.

Example 10

A parenteral solution having diuretic action is prepared by dissolving approximately 50 grams of alpha-D-3-methyl glucose in 100 ml. of water.

Example 11

A solution for intravenous use having diuretic action is prepared by combining 5 grams of alpha-D-3-methyl glucose and 6 grams of sodium arabinate in 100 ml. of water.

As an ingredient of syrups, and as a substitute for sucrose, 3-methyl glucose is also valuable for the preparation of pharmaceutical products utilizing syrups as a base.

In any event, whether eaten raw or incorporated in a carrier as described above, the new 3-methyl glucose will not metabolize to any substantial extent in the body; nor will it react to any substantial extent with the body fluids to produce, as by hydrolysis, carbohydrates or other substances which will metabolize.

While the above examples have been given and they illustrate the improved product as now produced, it will be understood that other combinations may be provided that will give the desired final result in providing a new and acceptable sweetening material with low caloric value.

In addition, it will be noted that the modified glucose will act in proper ratio doses as an effective diuretic without danger to the body as it contains none of the materials known to be harmful to the body.

As a diuretic, it may be taken orally or parenterally and either substantially alone or combined with other active ingredients or with inert substances.

Tablets may be prepared containing not less than about 25 milligrams up to about 100 milligrams of alpha-D-3-methyl glucose, preferably combined with an excipient to aid disintegration. If desired, other active ingredients may be incorporated, such as other diuretics, as theophylline, vitamins, cardiac stimulants, vasodilators, sedatives or antispasmodics. Thus a tablet containing 25–50 mg. of 3-methyl glucose and about 15 to about 30 mg. of a barbiturate, such as phenobarbital, is quite effective for combined diuretic and sedative action. Such tablets may be either enteric or plain coated, as desired.

The advantages of this invention and the products obtained by the improvements over glucose and sucrose or other sweetening agents or over other diuretics are to be considered as coming within the following claims.

We claim:

1. A sweetening agent composition, having non-metabolizing characteristics, comprising 3-methyl glucose.

2. A sweetening agent composition, having non-metabolizing characteristics, comprising 3-methyl glucose in lump form.

3. A new food product sweetened with 3-methyl glucose.

4. A new composition of matter comprising 3-methyl glucose, and a carrier therefor.

5. An edible composition of matter having an appreciable sweet taste and a relatively low metabolic action, containing 3-methyl glucose.

6. A medicinal liquid composition comprising 3-methyl glucose and a non-toxic carrier.

7. A medicinal composition having diuretic action comprising 3-methyl glucose and a non-toxic carrier.

8. In the art of baking, the employment of 3-methyl glucose mixed with edible ingredients.

9. The process comprising incorporating 3-methyl glucose with other ingredients and baking the mixture to produce an edible composition as the desired product.

10. A new composition of matter comprising a mixture of carbohydrates, one of said carbohydrates being 3-methyl glucose.

11. A soft drink composition comprising water, flavoring agent and 3-methyl glucose as a sweetening agent.

12. A tablet for oral use comprising the compound 3-methyl glucose and a disintegrating agent, said first-mentioned compound being present in an amount of at least about 25 milligrams.

13. A new composition of matter comprising a mixture of alpha- and beta-3-methyl glucose as sweetening agents having non-metabolizing action.

BRUCE OSBORNE.
HARRY E. HENNEMAN.

REFERENCES CITED

The following references are of record in the file of this patent:

UNITED STATES PATENTS

| Number | Name | Date |
| --- | --- | --- |
| 2,276,621 | Langlois | Mar. 17, 1942 |
| 2,305,620 | Kremers | Dec. 22, 1942 |
| 2,305,621 | Kremers | Dec. 22, 1942 |
| 2,390,507 | Cantor | Dec. 11, 1945 |